Sept. 24, 1929.  J. G. FAY  1,729,376
FRICTION CLUTCH
Filed July 5, 1927
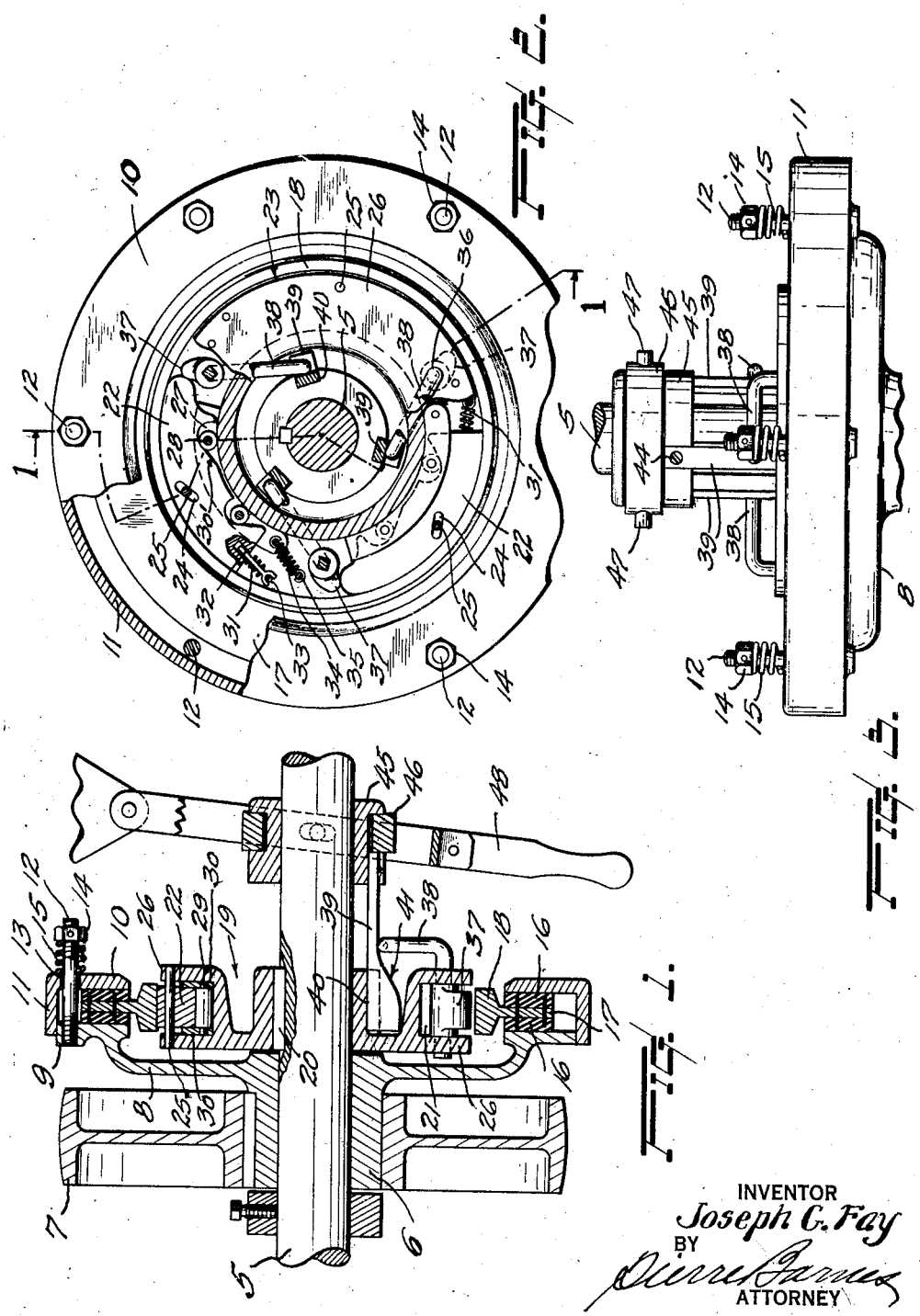
INVENTOR
Joseph G. Fay
BY
ATTORNEY Patented Sept. 24, 1929

1,729,376

UNITED STATES PATENT OFFICE

JOSEPH G. FAY, OF SEATTLE, WASHINGTON

FRICTION CLUTCH

Application filed July 5, 1927. Serial No. 203,396.

This invention relates to friction clutch devices and to the means for effecting the engagement and disengagement of the same.

The object of the invention, generally, is to provide improved and efficient devices of this character which will be of strong and durable construction.

More specific objects and advantages of the invention will appear in the following description.

The invention consists in the novel construction, adaptation and combination of parts hereinafter described and claimed.

In the accompanying drawing, illustrating an embodiment of the invention,—

Figure 1 is a view in longitudinal section taken substantially on broken line 1—1 of Fig. 2; Fig. 2 is a view partly in end elevation with parts broken away and partly in vertical transverse section; and Fig. 3 is a plan view with the hub of the driven member partly broken away and the controlling lever omitted.

In carrying out the invention I provide two members either of which may be utilized as the driving member and the other as the driven member and is operable in both rotary directions.

In the drawing, the reference numeral 5 designates a shaft upon which is mounted for independent rotary movement the hub 6 of what will hereinafter be termed the driven member of the clutch. From which driven member power may be transmitted by any known or suitable means as, for example, through the medium of an endless belt (not shown) passing about a pulley 7 which is secured to the hub 6.

Integral with the hub 6 is a web 8 having a peripheral plate element 9 disposed in parallel relation with an annular plate 10 which is integral with a circular flange 11 which is sleeved upon the plate element 9 for relative axial movement.

12 represent screw threaded bolts secured to the plate 9 and extending through holes, as 13 in Fig. 1, of the companion plate 10 for coupling the plates together for conjoint rotary motion.

Secured to the projecting portions of the respective bolts are adjustable collars 14 between which and the plate 10 are springs 15 acting to draw said plates toward each other and into normally engaged relation with friction liners 16 which are secured to opposite sides of the peripheral rib 17 of a ring 18.

In operating under load conditions for which the springs 15 are regulated the ring is caused to rotate as a part of the driven member; yet under an excessive load and in overcoming the inertia of such driven member and the parts and load driven thereby, slippage is permitted by the provision of frictional engagement between the liners 16 and the plate elements 9 and 10. The driving member of the clutch comprises a wheel 19 which is secured as by means of a key 20 to the shaft 5 and, as shown, is provided with a peripheral groove 21. Mounted for limited circumferential and radial movements in said groove is a plurality of clutch blocks 22 each having an arcuate outer surface 23 for frictional engagement with the inner peripheral surface of said ring 18.

Each of said blocks is provided with a slot 24 arranged somewhat tangentially, as shown in Fig. 2, with respect to a circle concentric of the shaft axis.

Extending through each of the slots 24 is a pin 25 having its ends secured to the wheel flanges 26 at opposite sides of the groove 21. The pins 25 and slots 24 serve to prevent the respective blocks from being moved radially outward by centrifugal force, yet permit endwise movement of the blocks in one circumferential direction or the other into and from engageable relation with the ring 18. In their inner sides with respect to the shaft, the blocks 22 are provided with recesses 27 to receive rollers 28 having axles, as 29, journaled in frame elements 30 provided in the wheel groove at opposite sides of the respective blocks 22. Said rollers bear against the circular bottom surface of the wheel groove and engage against inclined cam faces 30¹ of the blocks at the respective recesses, so that when the blocks are moved in one direction circumferentially of the wheel the cam faces of the blocks coact with the rollers to force the blocks radially outward of the wheel into clutching relation with the ring 18 of the driven member to effect the rotation of the same.

Each of the blocks is held normally in its clutching relation by means of a compression spring acting between an end of a block, and a stop secured to the wheel. As illustrated, the above referred to spring connection, comprises a spring 31 surrounding a guide rod 32 between a forked end of the latter and the respective block, the rod's forked end engaging a stop, or pin, 33 secured to the wheel. 34 represents an extensible spring, one for each set of rollers, and connecting the frame elements 30 thereof with pins 35 of the wheel for retaining the rollers in contact with the respective cam surfaces 30¹ of the blocks.

For shifting the blocks out of clutching relation with respect to the ring 18, I provide lever devices which are fulcrumed in holes, as 36, of the wheel webs 26.

One arm of each lever is provided within the wheel groove with a finger attachment 37 which is engageable with the respective block 22.

The other arm 38 of a lever is engageabble by means of an operating bar 39 slidable in a way 40 provided in the wheel hub. Each of said bars is provided with a sloping surface 41 adapted to engage the respective lever arm 38.

Said bars are secured, as by means of screws 44, (Fig. 3) in grooves provided in the periphery of a collar 45 which is mounted for relative longitudinal movement upon the shaft 5. As shown, said collar is provided with a peripheral groove to receive a ring 46 having at diametrically opposite sides pins 47 engaging in apertures provided in branches of a controlling lever 48 which is employed for shifting the collar 45 to carry the bars 39 into and from operating relation with the block disengaging levers.

From the foregoing description it is seen that the blocks 22 which are carried by the driving member provide frictional engagement between the members of the clutch.

Said blocks are normally held in operable relation with the ring 18 by the rolling contact of the rollers 28 with the cam faces 30¹ of the blocks when the latter are actuated by the respective springs 31.

The disengagement of the clutch members from each other is attained by shifting the blocks in opposition to the springs 31 by means of the respective fingers 37 when the associated lever arms 38 are forced outwardly by the sloping faces 41 of bars 39 when the latter are suitably shifted by means of the controlling lever 48.

While I have illustrated and described an embodiment of the invention now preferred by me, I do not wish to confine myself specifically thereto except as limited by the scope of the following claims.

What I claim, is,—

1. A friction clutch comprising in combination, a driving member, a driven member surrounding the driving member concentrically of its axis, friction devices carried by the driving member, said friction devices being provided with cam surfaces, thrust devices mounted upon the periphery of the driving member, circumferentially movable frames carrying said thrust devices, yieldable means connected to said frames for retaining the thrust devices in engaged relations with the cam surfaces of the respective friction devices, means for regulating said friction devices to render the thrust devices operative to effect coupling of the clutch members, and means acting through the medium of the friction devices for disengaging the same to release the clutch members with respect to each other.

2. A friction clutch comprising in combination, a driving member, a driven member, friction devices carried by the driving member, said friction devices being provided with cam surfaces, rotary thrust devices mounted upon the driving member, frames carrying said thrust devices, springs connecting the driving member to the respective frames for regulating the latter to retain the thrust devices in engaged relations with the cam surfaces of the respective friction devices, automatic means for regulating said friction devices to render the thrust devices operative to effect coupling of the clutch members, and means acting through the medium of the friction devices for disengaging the same to release the clutch member with respect to each other.

3. In a friction clutch, the combination with a driving member and a driven member located one within the other, friction blocks interposed between the outer and inner peripheries of the respective members, said blocks being carried by the inner member and adapted to be engaged with the outer member, means provided on said inner member for preventing the blocks being moved by centrifugal force into engaged relation with said outer member, and manually operable means for effecting engageable movements of the blocks with respect to said outer member for actuating the clutch.

4. In a friction clutch, the combination with a driving member and a driven member located one within the other, friction blocks interposed between the outer and inner peripheries of the respective members, said blocks being carried by the inner member and adapted to be engaged with the outer member, means provided on said inner member for preventing the blocks being moved by centrifugal force into engaged relation with said outer member, and thrust devices coacting with said blocks for moving the latter into engageable relations with the outer of said clutch members.

Signed at Seattle, Washington, this 10th day of June, 1927.

JOSEPH G. FAY.